Jan. 13, 1925.  W. O'BANNON  1,522,831
HOISTING HOOK
Filed July 13, 1923
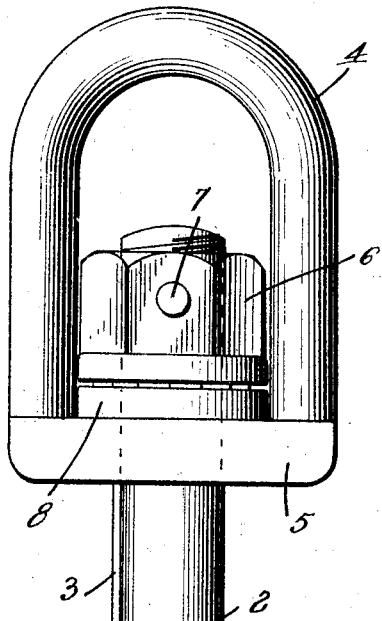
Fig. 1.
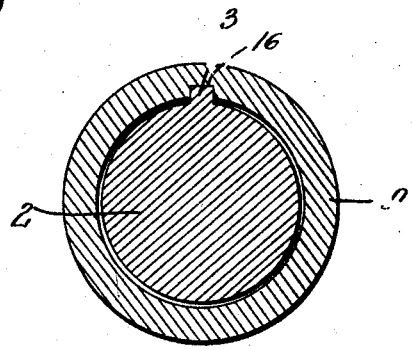
Fig. 2.
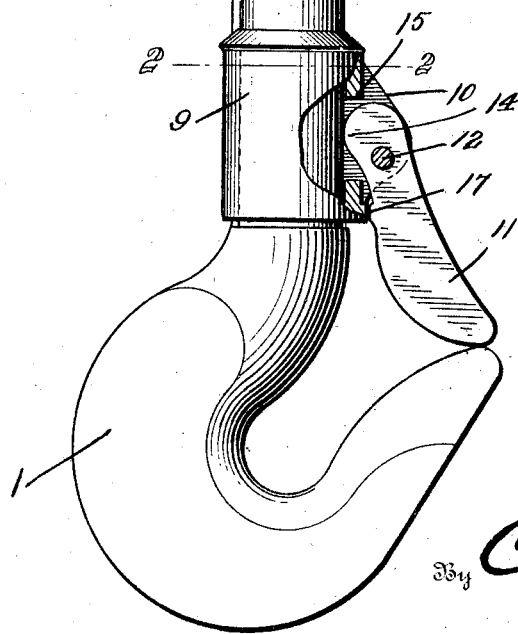
W. O'Bannon, Inventor
By C.A. Snow & Co.
Attorneys Patented Jan. 13, 1925.

1,522,831

UNITED STATES PATENT OFFICE.

WALTER O'BANNON, OF TULSA, OKLAHOMA.

HOISTING HOOK.

Application filed July 13, 1923. Serial No. 651,316.

*To all whom it may concern:*

Be it known that I, WALTER O'BANNON, a citizen of the United States, residing at Tulsa, in the county of Tulsa and State of Oklahoma, have invented new and useful Hoisting Hooks, of which the following is a specification.

This invention aims to provide, in a hoisting hook, novel means whereby the hook will be prevented from fouling the rigging, or any overhead structure, when the hook is raised. Another object of the invention is to provide a novel keeper for the hook, the construction being such that when any article on the hook is raised, the keeper will be prevented from opening with respect to the hook, it being possible, however, to move the keeper out of operative relation to the hook at the will of an operator.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in elevation, a device constructed in accordance with the invention, parts being broken away; Figure 2 is a cross section on the line 2—2 of Figure 1.

The numeral 1 marks a suspension element, such as a hook, having a shank 2 provided with an outstanding longitudinal rib 3. The numeral 4 designates an inverted U-shaped shackle comprising a base 5 through which the shank 2 passes, and wherein the shank is rotatable. A retaining member 6 such as a nut, is mounted on the upper end of the shank 2, within the contour of the shackle 4 and is held by a pin 7 or other securing means, against rotation on the shank 2. An anti-friction bearing 8 surrounds a portion of the shank 2 and is interposed between the nut 6 and the base 5 of the shackle 4. It is to be observed that the upper end of the rib 3, cooperating with the base 5 of the shackle 4, prevents the shackle 4 from sliding downwardly on the shank 2 of the hook 1.

A tubular rider 9 is mounted for reciprocation on the shank 2, longitudinally of the shank, and is provided with outstanding ears 10 carrying a pivot element 12 whereon a keeper 11 is mounted, intermediate its ends, for vertical swinging movement in a plane parallel to the axis of the shank 1. The keeper 11 cooperates with the bill of the hook 1. The lower end of the keeper 11 may rest on the bill of the hook, or an inwardly projecting lug 17 on the inner edge of the keeper 11 cooperating with the rider 9 may limit the downward and inward swinging movement of the keeper 11. The keeper 11 has an upper cam end 14, operating in an opening 15 formed in the rider 9 and cooperating with the shank 2 in a way to be pointed out hereinafter. In order to hold the keeper 10 in a common plane with the hook 1, to the end that the keeper 11 may cooperate with the bill of the hook, the rider 9 has an internal groove 16 receiving the rib 3 on the shank 2 of the hook 1.

Supposing that the parts are in the position delineated in Figure 1, it will be clear that when an object of any kind on the hook 1 is raised, the object, striking the keeper 11, will cause the cam end 14 of the keeper to engage with the shank 2, the keeper thus being prevented from moving to open position with respect to the hook 1. In handling the device, the operator may conveniently grasp the rider 9 and slide the rider upwardly on the shank 2, thereby carrying the keeper 11 out of engagement with the bill of the hook 1, whereupon any object engaged within the hook may be detached therefrom. When the keeper 11 is in the position shown in Figure 1, it will be obvious that the device may be raised without causing the overhead rigging or tackle to foul the hook 1.

What is claimed is:

1. In a device of the class described, a hook having a shank, a rider mounted for reciprocation on the shank, and a keeper fulcrumed intermediate its ends on the rider one end of the keeper cooperating with the hook to close the hook, and the other end of the keeper cooperating with the shank to maintain the keeper in operative relation to the hook when an object within the hook is brought into engagement with the keeper.

2. In a device of the class described, a hook having a shank, a rider mounted for reciprocation on the shank, a keeper fulcrumed intermediate its ends on the rider, one end of the keeper cooperating with the hook, and the other end of the keeper cooperating with the shank, and interengaging elements on the rider and on the shank, cooperating to maintain the keeper in a common plane with the hook.

3. In a device of the class described, a hook having a shank, the shank having an outstanding longitudinal rib, a retainer on the shank, a shackle on the shank and comprising a part interposed between one end of the rib and the retainer, a rider mounted for reciprocation on the shank, a keeper fulcrumed intermediate its ends on the rider, one end of the keeper cooperating with the hook, and other end of the keeper cooperating with the shank, the rider having a groove receiving the rib, and serving to hold the keeper in parallel operative relation to the hook.

4. In a device of the class described a hook having a shank, a rider mounted to reciprocate on the shank, and a keeper fulcrumed intermediate its ends on the rider, one end of the keeper cooperating with the hook to close the hook, and the other end of the keeper cooperating with the shank to maintain the keeper in operative relation to the hook when an object within the hook is brought into engagement with the keeper, the rider being held against rotation on the shank, thereby to hold the keeper in parallel operative relation to the hook.

In testimony that I claim the foregoing as my own, I have hereto affixed my signature in the presence of two witnesses.

WALTER O'BANNON.

Witnesses:
    DEWEY NICHOLS,
    ED DALTON.